United States Patent
Sako et al.

(10) Patent No.: US 12,086,006 B2
(45) Date of Patent: Sep. 10, 2024

(54) CONTROLLER UNIT AND POWER SUPPLY OPERATION METHOD FOR GENERAL-PURPOSE OPERATING SYSTEM

(71) Applicant: Mitsubishi Electric Corporation, Tokyo (JP)

(72) Inventors: Hideaki Sako, Nagoya (JP); Hidekazu Higashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/574,748

(22) PCT Filed: Sep. 10, 2021

(86) PCT No.: PCT/JP2021/033423
§ 371 (c)(1),
(2) Date: Dec. 28, 2023

(87) PCT Pub. No.: WO2023/037524
PCT Pub. Date: Mar. 16, 2023

(65) Prior Publication Data
US 2024/0272692 A1 Aug. 15, 2024

(51) Int. Cl.
*G06F 1/28* (2006.01)
(52) U.S. Cl.
CPC ..................... *G06F 1/28* (2013.01)
(58) Field of Classification Search
CPC ........................................................ G06F 1/28
(Continued)

(56) References Cited

U.S. PATENT DOCUMENTS

2015/0170441 A1 6/2015 Kimura
2016/0328957 A1 11/2016 Matsuda
2017/0293509 A1* 10/2017 Maki ....................... G06F 9/442

FOREIGN PATENT DOCUMENTS

JP H11-039066 A 2/1999
JP 6808090 B1 1/2021
(Continued)

OTHER PUBLICATIONS

International Search Report and Written Opinion mailed on Nov. 9, 2021, received for PCT Application PCT/JP2021/033423, filed on Sep. 10, 2021, 9 pages including English Translation.
(Continued)

*Primary Examiner* — Michael J Brown
(74) *Attorney, Agent, or Firm* — XSENSUS LLP

(57) ABSTRACT

A controller unit in a programmable controller includes a real-time OS implementer including a first processor to implement a real-time OS, and a general-purpose OS implementer including a second processor to implement a general-purpose OS. The real-time OS implementer further includes a receiver circuit to receive a device value indicating an instruction for changing a power supply state of the general-purpose OS including activation and deactivation of the general-purpose OS, and a power operation circuit to activate the general-purpose OS. The real-time OS implementer activates the general-purpose OS using the power operation circuit when the receiver circuit receives the device value for activating the general-purpose OS. The general-purpose OS implementer deactivates the general-purpose OS when the receiver circuit receives the device value for deactivating the general-purpose OS.

10 Claims, 7 Drawing Sheets

(58) Field of Classification Search
USPC .................................................. 713/300, 340
See application file for complete search history.

(56) References Cited

FOREIGN PATENT DOCUMENTS

| WO | 2015/025367 A1 | 2/2015 |
| WO | 2015/114818 A1 | 8/2015 |

OTHER PUBLICATIONS

Idehara et al., "Design of multi-OS execution environment under built-in constraints", Proceedings of Embedded System Symposium 2014, Oct. 15, 2014 Available Online at: https://ipsj.ixsq.nii.ac.jp/ej/?action=repository_uri&item_id=I06418&file_id=I&file_no=I>, pp. 114-119 (8 pages including English Abstract).
Decision to Grant mailed on Mar. 29, 2022, received for JP Application 2022-506624, 5 pages including English Translation.

* cited by examiner

CONTROLLER UNIT AND POWER SUPPLY OPERATION METHOD FOR GENERAL-PURPOSE OPERATING SYSTEM

CROSS-REFERENCE TO RELATED APPLICATION

This application is based on PCT filing PCT/JP2021/033423, filed Sep. 10, 2021, the entire contents of which are incorporated herein by reference.

TECHNICAL FIELD

The present disclosure relates to a controller unit and a power supply operation method for operating a power supply for a general-purpose operating system.

BACKGROUND ART

Programmable controllers are often used at factory automation (FA) sites as controllers for controlling devices. Such programmable controllers perform coordinated control over many devices by, for example, implementing applications with a real-time operating system (OS).

To respond to the recent increasing demand for data collection and data analysis, programmable controllers with a general-purpose OS to perform general information processing are awaited. Thus, controllers have been developed to implement both a real-time OS and a general-purpose OS (see, for example, Patent Literature 1).

Patent Literature 1 describes a controller including a distribution control central processing unit (CPU) to implement a real-time OS and an information processing CPU to implement a general-purpose OS connected through a serial interface. In this controller, the distribution control CPU periodically measures the operating state of the information processing CPU and determines whether to request the information processing CPU to perform a task based on the measured operating state. This allows distribution of the information processing loads.

CITATION LIST

Patent Literature

Patent Literature 1: Japanese Patent No. 6808090

SUMMARY OF INVENTION

Technical Problem

Programmable controllers typically continue to operate for a long time. Thus, in the controller described in Patent Literature 1, the information processing CPU for implementing a general-purpose OS consumes a large amount of power. A programmable controller with such a general-purpose OS is to have less power consumption.

In the above circumstances, an objective of the present disclosure is to reduce the power consumption of a programmable controller with a general-purpose OS.

Solution to Problem

To achieve the above objective, a controller unit in a programmable controller according to an aspect of the present disclosure includes real-time operating system implementation means including a first processor for implementing a real-time operating system, and general-purpose operating system implementation means including a second processor for implementing a general-purpose operating system. The real-time operating system implementation means further includes reception means for receiving instruction data indicating an instruction for changing a power supply state of the general-purpose operating system including activation and deactivation of the general-purpose operating system, and a power operation circuit to activate the general-purpose operating system. The real-time operating system implementation means activates the general-purpose operating system using the power operation circuit when the reception means receives the instruction data for activating the general-purpose operating system. The general-purpose operating system implementation means deactivates the general-purpose operating system when the reception means receives the instruction data for deactivating the general-purpose operating system.

Advantageous Effects of Invention

The technique according to the above aspect of the present disclosure can reduce the power consumption of a programmable controller with a general-purpose OS.

DESCRIPTION OF EMBODIMENTS

A programmable controller according to one or more embodiments of the present disclosure is described in detail below with reference to the drawings.

Embodiment 1

A programmable logic controller (PLC) 100 according to the present embodiment includes a controller unit 120 that activates and deactivates a general-purpose operating system (OS) based on external instructions. The controller unit 120 activates the general-purpose OS in response to a request from an external device for information processing with the general-purpose OS, and deactivates the general-purpose OS upon completion of the information processing. An overview of the PLC 100 is described first, and the controller unit 120 is then described.

Figure 1:
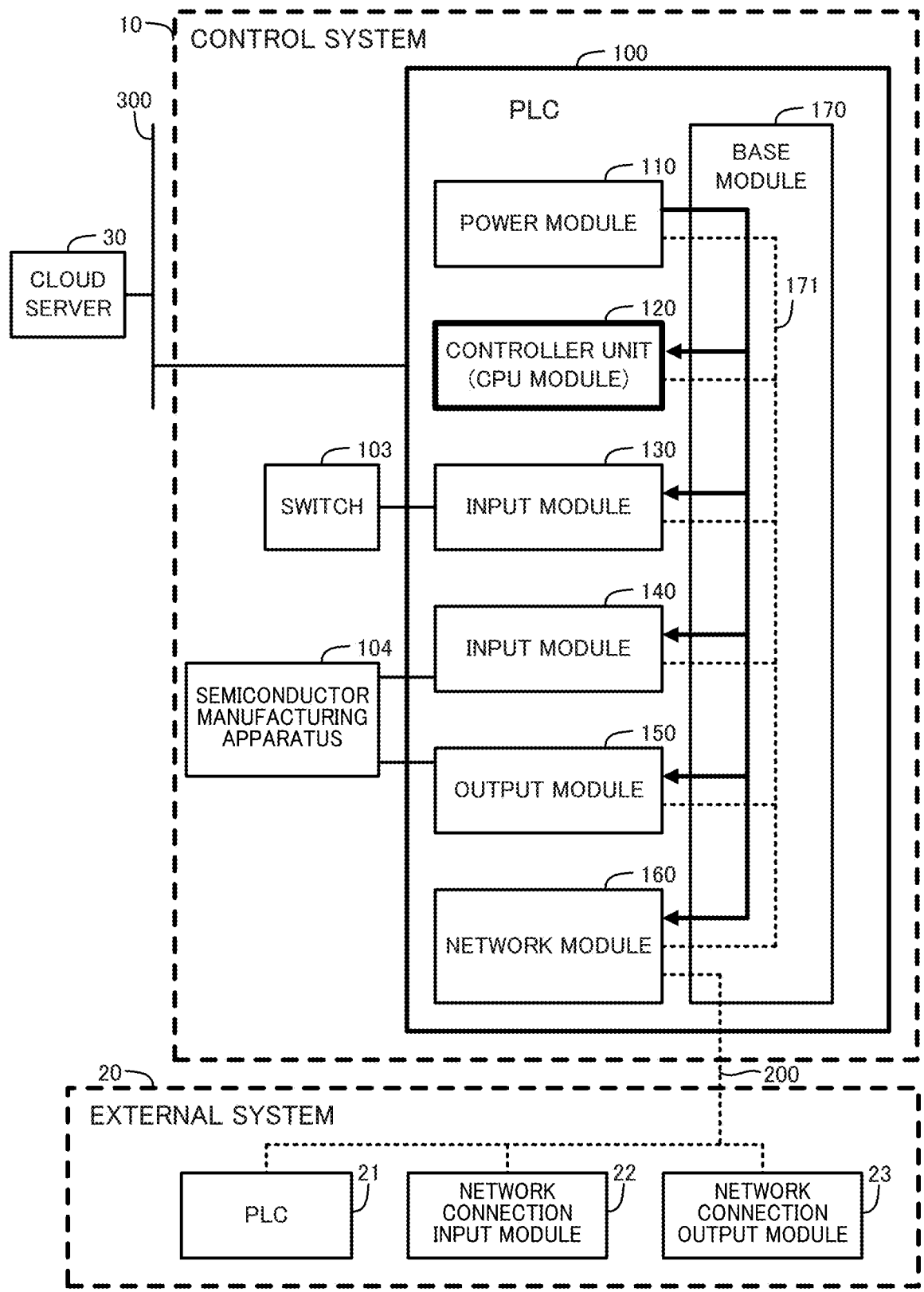
FIG. 1 is a block diagram of a control system according to Embodiment 1.

The PLC 100 is included in a control system 10 including a switch 103 and a semiconductor manufacturing apparatus 104 as illustrated in FIG. 1. The control system 10 corresponds to a part of a factory automation (FA) system installed at a factory. The control system 10 is connected to a cloud server 30 through a network 300 such as the Internet. The control system 10 is connected to an external system 20 that corresponds to a part of the FA system, similarly to the control system 10, through an internal industrial network 200 at the factory.

The PLC 100 in the control system 10 is a controller that controls devices. More specifically, the PLC 100 operates a production line for a semiconductor product by controlling the semiconductor manufacturing apparatus 104 when receiving inputs including the state of the switch 103. The PLC 100 is a building-block programmable controller that combines multiple modules. More specifically, the PLC 100 includes a power module 110 to supply power to other modules, a controller unit 120 corresponding to a central processing unit (CPU) module to determine the operation of the PLC 100 by controlling other modules, an input module 130 to receive a signal indicating the state of the switch 103, an input module 140 to receive a signal input from the semiconductor manufacturing apparatus 104, an output module 150 to output a signal to the semiconductor manufacturing apparatus 104, and a network module 160 to communicate through the industrial network 200. These modules are mounted on a base module 170.

The power module 110 supplies power to the other modules through power lines in the base module 170, as indicated by the bold arrows in FIG. 1. The base module 170 includes a PLC bus 171 as a signal line for communication between modules, as indicated by the dashed lines in FIG. 1. The controller unit 120 acquires, through the base module 170, data indicating the state of the switch 103 from the input module 130 as well as data output from the semiconductor manufacturing apparatus 104 from the input module 140. The controller unit 120 also controls the semiconductor manufacturing apparatus 104 by transmitting a control command to the output module 150 through the base module 170. The controller unit 120 also cooperates with devices in an external system 20 through the base module 170 and the network module 160. The controller unit 120 is directly connected to and communicates with the network 300 without the base module 170 in between.

The external system 20 includes a PLC 21 including multiple modules similarly to the PLC 100 in the control system 10, a network connection input module 22 connected to a device (not illustrated) to receive a signal input from the device, and a network connection output module 23 connected to a device (not illustrated) to output a signal to the device. The PLC 21, the network connection input module 22, and the network connection output module 23 are all connected to the industrial network 200 to communicate with the network module 160 in the PLC 100. The PLC21 cooperates with the PLC 100 to control many devices in a coordinated manner. The network connection input module 22 and the network connection output module 23 perform the same functions as the input module 140 and the output module 150 in the PLC 100 through the industrial network 200. The PLC 100 may perform control based on a signal input into the network connection input module 22, and may control devices connected to the network connection output module 23.

Figure 2:
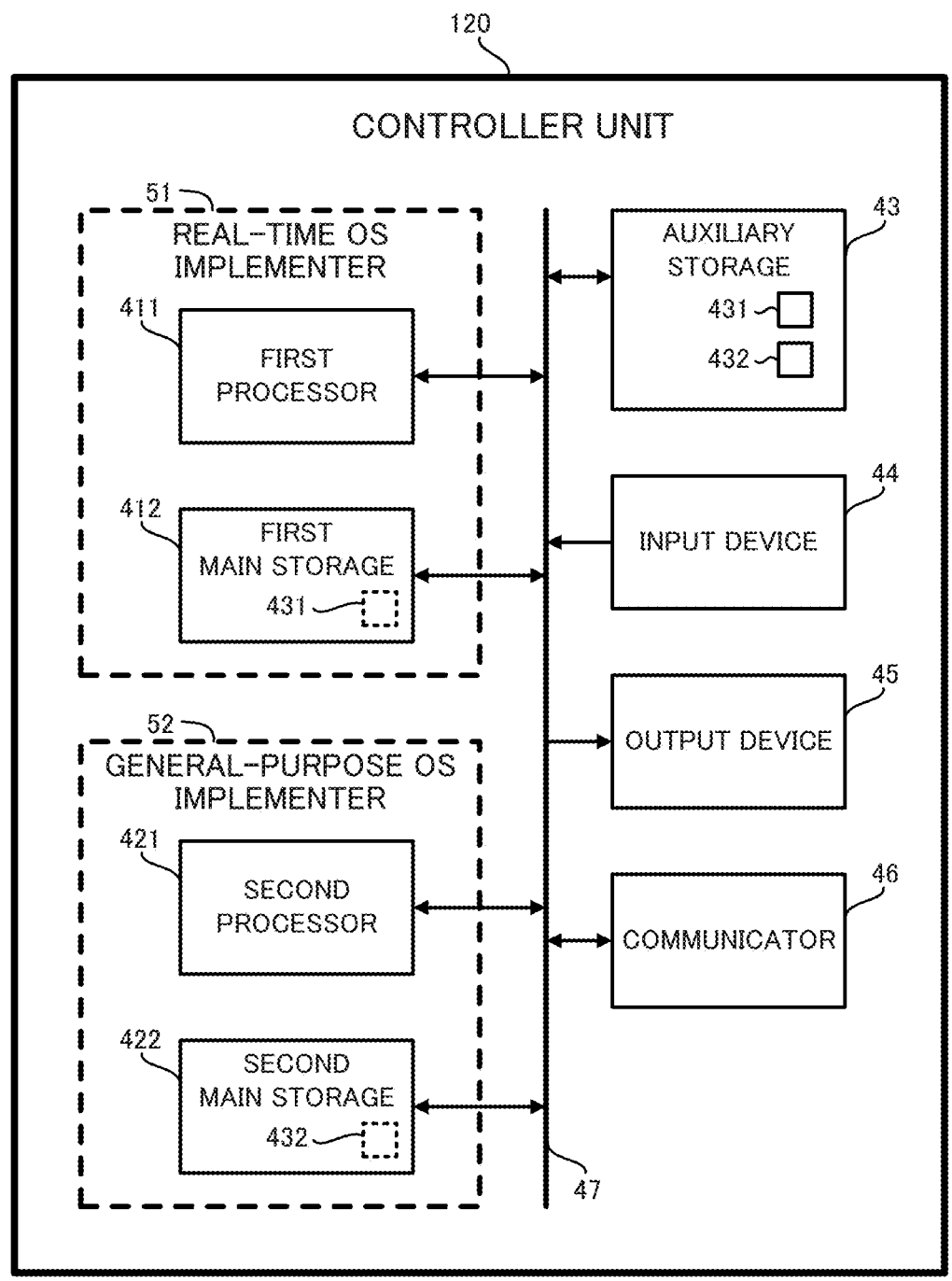
FIG. 2 is a block diagram of a controller unit according to Embodiment 1, illustrating the hardware configuration.

FIG. 2 illustrates the hardware components of the controller unit 120 that is a computer. The controller unit 120 includes, as the hardware components, a real-time OS implementer 51 including a first processor 411 and a first main storage 412, a general-purpose OS implementer 52 including a second processor 421 and a second main storage 422, an auxiliary storage 43, an input device 44, an output device 45, and a communicator 46. The first main storage 412, the second main storage 422, the auxiliary storage 43, the input device 44, the output device 45, and the communicator 46 each are connected to the first processor 411 and the second processor 421 with an internal bus 47.

The first processor 411 and the second processor 421 each include a CPU or a micro processing unit (MPU) that is an integrated circuit. The first processor 411 executes a program 431 stored in the auxiliary storage 43 to implement various functions of the real-time OS implementer 51 and perform the processing described later. The program 431 includes a real-time OS as software and a ladder program to control devices. A real-time OS is an OS for real-time processing. For a real-time OS, to ensure a real-time computational operation, an upper limit is predetermined for the time from the issuance of a command to perform a computational operation to the completion of the computational operation.

The second processor 421 executes a program 432 stored in the auxiliary storage 43 to implement various functions of the general-purpose OS implementer 52 and perform the processing described later. The program 432 includes a general-purpose OS as software and application software to be executed with the general-purpose OS. A general-purpose OS is an OS for general information processing. For a general-purpose OS, unlike in a real-time OS, no upper limit is predetermined for the time taken to perform a computational operation. In the control system 10, information processing by the general-purpose OS and the application software with the general-purpose OS may not be performed constantly. Such information processing is to be performed in limited situations, for example, in analyzing information when an abnormality occurs, and in collecting and analyzing data after a predetermined period of operation.

The first main storage 412 and the second main storage 422 each include a random-access memory (RAM). The program 431 is loaded from the auxiliary storage 43 into the first main storage 412. The first main storage 412 is used as a work area for the first processor 411. The program 432 is loaded from the auxiliary storage 43 into the second main storage 422. The second main storage 422 is used as a work area for the second processor 421.

The auxiliary storage 43 includes a nonvolatile memory such as an electrically erasable programmable read-only memory (EEPROM) and a hard disk drive (HDD). The auxiliary storage 43 stores various sets of data used for processing in the first processor 411 and the second processor 421, in addition to the programs 431 and 432. The auxiliary storage 43 provides data usable by the first processor 411 to the first processor 411 as instructed by the first processor 411, and stores data provided from the first processor 411. The auxiliary storage 43 provides data usable by the second processor 421 to the second processor 421 as instructed by the second processor 421, and stores data provided from the second processor 421.

In FIG. 2, a single auxiliary storage 43 is used. In some embodiments, a first auxiliary storage 43 may be used by the real-time OS implementer 51 and a second auxiliary storage 43 may be used by the general-purpose OS implementer 52 as separate components. One of the separate auxiliary storages 43 may be included in the real-time OS implementer 51, and the other may be included in the general-purpose OS implementer 52. The real-time OS implementer 51 and the general-purpose OS implementer 52 may be mounted on different substrates or on a single substrate. The real-time OS implementer 51 in the controller unit 120 corresponds to an example of real-time OS implementation means including a first processor for implementing a real-time OS. The general-purpose OS implementer 52 in the controller unit 120 corresponds to an example of general-purpose OS implementation means including a second processor for implementing a general-purpose OS.

The input device 44 includes input devices, typically input keys and a pointing device. The input device 44 acquires information input into the PLC 100 by the user and provides the acquired information to the first processor 411 and the second processor 421. The information acquired by the input device 44 includes, for example, parameters to determine the operation of the PLC 100.

The output device 45 includes, for example, a light-emitting diode (LED), a liquid crystal display (LCD), or a speaker. The output device 45 presents various items of information to the user as instructed by the first processor 411 and the second processor 421.

The communicator 46 includes a network interface circuit for transmitting or receiving an Ethernet frame with an external device and a communication interface circuit for transmitting or receiving data through the PLC bus 171 in the base module 170. The communicator 46 receives a signal from an external device and outputs data indicated by the signal to the first processor 411 and the second processor 421. The communicator 46 also transmits a signal indicating data output from the first processor 411 and the second processor 421 to an external device.

Figure 3:
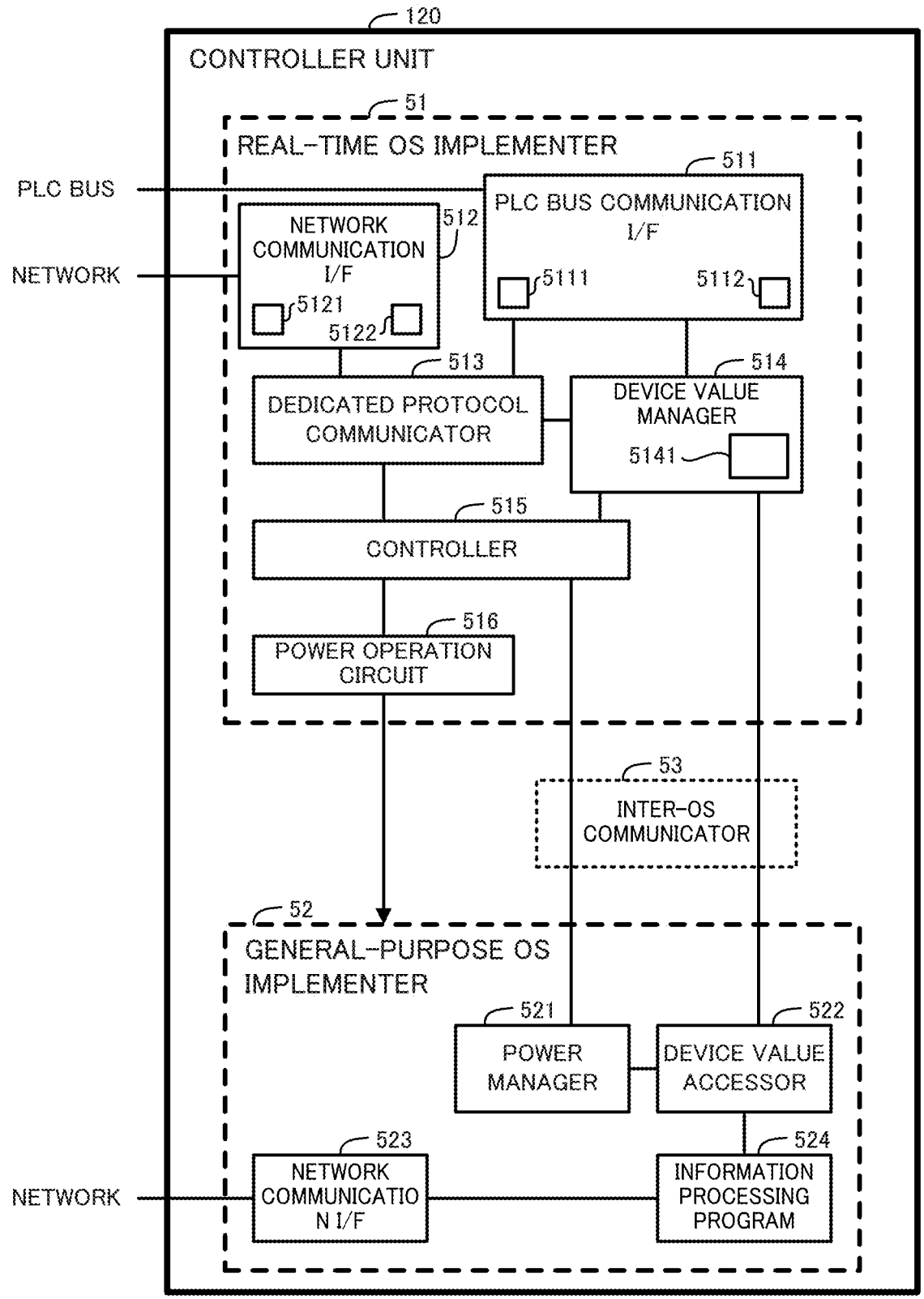
FIG. 3 is a functional block diagram of the controller unit according to Embodiment 1.

In the controller unit 120, the hardware components described above work in cooperation to implement the real-time OS and the general-purpose OS independently of each other. More specifically, as illustrated in FIG. 3, the controller unit 120 includes, as the functional components, the real-time OS implementer 51 that implements the real-time OS, the general-purpose OS implementer 52 that implements the general-purpose OS, and an inter-OS communicator 53 for communication between the operating systems. The inter-OS communicator 53 corresponds to the internal bus 47 in FIG. 2.

The real-time OS implementer 51 includes a PLC bus communication interface (I/F) 511 for communicating through the PLC bus 171, a network communication IF 512 for communicating through the network 300, a dedicated protocol communicator 513 for communicating through the network 300 and the industrial network 200 using a predetermined dedicated protocol, a device value manager 514 that stores and manages device values indicating instructions for changing the power supply state of the general-purpose OS, a controller 515 for controlling the components of the real-time OS implementer 51, and a power operation circuit 516 for activating the general-purpose OS. The device values managed by the device value manager 514 correspond to an example of instruction data indicating an instruction for changing the power supply state of the general-purpose OS, including activating and deactivating the general-purpose OS. The device value manager 514 corresponds to an example of storage means for storing instruction data.

The PLC bus communication I/F 511 and the network communication I/F 512 each correspond to the communicator 46. The PLC bus communication I/F 511 includes a receiver circuit 5111 to receive data from modules other than the controller unit 120, and a transmitter circuit 5112 to transmit data to those modules through the PLC bus 171. The network communication I/F 512 includes a receiver circuit 5121 to receive data and a transmitter circuit 5122 to transmit data through the network 300. The receiver circuits 5111 and 5121 each correspond to an example of reception means for receiving instruction data in the controller unit 120.

The dedicated protocol communicator 513 is mainly implemented by the first processor 411. The dedicated protocol communicator 513 communicates with the cloud server 30 on the network 300 through the network communication I/F 512 using a dedicated protocol. The dedicated protocol communicator 513 communicates with the external system 20 on the industrial network 200 through the PLC bus communication I/F 511 and the network module 160 using a dedicated protocol.

Figure 4:
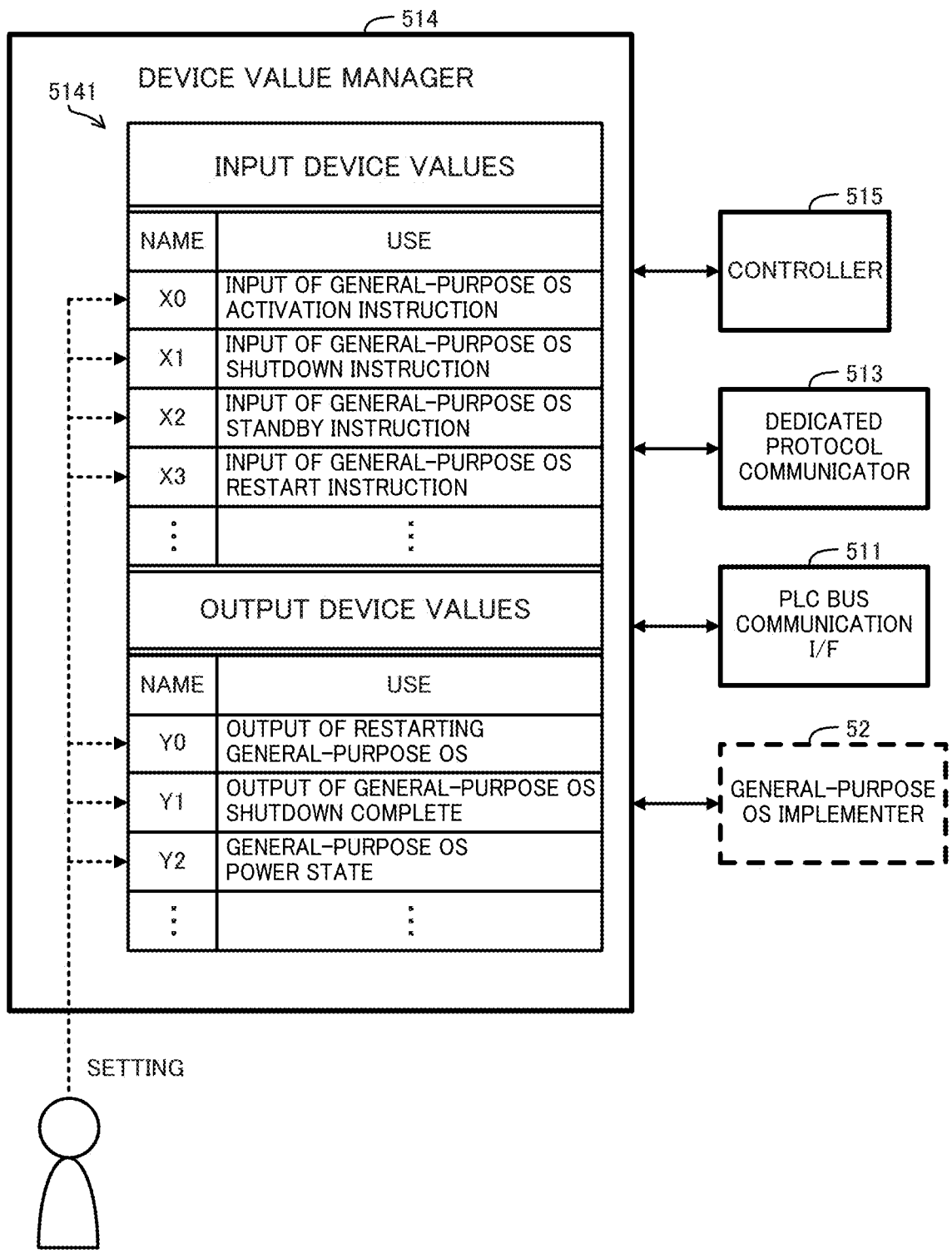
FIG. 4 is a diagram describing device values in Embodiment 1.

The device value manager 514 is mainly implemented by the first processor 411 and the auxiliary storage 43 operating in cooperation. The device value manager 514 includes a storage area 5141 that includes multiple areas each storing a device value. As illustrated in FIG. 4, the storage area 5141 includes areas for input device values and areas for output device values, each with a predetermined name and use. The areas for input device values include areas into which instructions on the power supply state of the general-purpose OS are input. For example, an area identified as X0 among other areas stores an input value for instructions for activating the general-purpose OS. An input value of 1 in this area indicates that, for example, an activating instruction is entered. An input value of zero indicates that no activating instruction is entered.

Activating the general-purpose OS includes a transition from the power OFF state in which the general-purpose OS implementer 52 consumes no power to the power ON state in which the general-purpose OS implementer 52 can consume power to perform the functions of the general-purpose OS, returning from a standby state that reduces power consumption by storing information in the second main storage 422 as appropriate, and restarting the system by causing the system to transition from the power ON state, to the power OFF state, and again to the power ON state.

An area X1 stores an input value indicating an instruction for a shutdown of the general-purpose OS, and an area X2 stores an input value indicating an instruction for standby of the general-purpose OS. A shutdown refers to a transition from the power ON state to the power OFF state. An instruction for standby refers to an instruction for causing a transition from the power ON state to the standby state. These instructions for shutdown and standby correspond to an example of an instruction for deactivating the general-purpose OS.

The areas for output device values store information on notifications about the power supply state of the general-purpose OS to a device external to the controller unit 120. For example, the area Y0 stores an output value indicating whether the general-purpose OS is restarting. The output value 1 indicates that, for example, the general-purpose OS is restarting. The output value zero indicates that the general-purpose OS is not restarting. For example, the area Y2 stores an output value indicating whether the current power supply state of the general-purpose OS is the power ON, power OFF, or standby state.

These device values stored in the storage area 5141 are synchronized with data in a device external to the controller unit 120, or are to be read by and written by the external device. The relationship between the external device and device values in the controller unit 120 is described below.

Other modules mounted on the base module 170 together with the controller unit 120 each access the device values in the storage area 5141 through the PLC bus 171 and the PLC bus communication I/F 511. With these accesses, device values are synchronized across modules, and the device values stored in the storage area 5141 are read by and written by other modules. For example, assigning the device value X0 to the input from the switch 103 into the input module 130 to synchronize the device value with the input in presetting parameters for the PLC 100 causes the value X0 to immediately reflect the input into the switch 103. When the switch 103 is, for example, an emergency stop switch for a production line, stopping the production line simultaneously inputs an instruction for activating the general-purpose OS. Similarly, assigning the device value Y1 to the output from the output module 150 to the semiconductor manufacturing apparatus 104 to synchronize the device value with the output causes the output to the semiconductor manufacturing apparatus 104 to immediately reflect the device value Y1. When, for example, the general-purpose OS ends analyzing the cause of an emergency stop and a production line is to be restarted, a control command is provided to the semiconductor manufacturing apparatus 104 upon completion of shutdown of the general-purpose OS.

The devices in the external system 20 communicate with the network module 160 through the industrial network 200 using a predetermined dedicated protocol, and access the device values in the storage area 5141 through the network module 160, the PLC bus communication I/F 511, and the dedicated protocol communicator 513. With these accesses, device values are synchronized between the controller unit 120 and the external system 20, and the device values stored in the storage area 5141 are read by and written by devices in the external system 20. For example, the user assigns the values held by the PLC 21, the network connection input module 22, and the network connection output module 23 to the device values in the storage area 5141 in presetting parameters for the PLC 100. Thus, values changed by a control program executed by the PLC 21 or values input into the network connection input module 22 are reflected to the input device values in the storage area 5141. The output device values in the storage area 5141 are reflected to the values used by the PLC 21 or the values output from the network connection output module 23.

The modules in the PLC 100 and the devices in the external system 20 each determine the power supply state of the general-purpose OS in the controller unit 120 by referring to the output device values in the storage area 5141, and write an input device value indicating an instruction for activating the general-purpose OS into the storage area 5141 when information processing by the general-purpose OS being deactivated is to be performed. When the intended information processing ends, the modules in the PLC 100 and the devices in the external system 20 write an input device value indicating an instruction for deactivating the general-purpose OS into the storage area 5141.

The device values in the storage area 5141 may also be accessed by the cloud server 30 through the network 300, the network communication I/F 512, and the dedicated protocol communicator 513. The cloud server 30 may periodically collect device values and manage the histories of the device values.

Referring back to FIG. 3, the controller 515 is mainly implemented by the first processor 411. The controller 515 controls the PLC bus communication I/F 511, the network communication IF 512, the dedicated protocol communicator 513, and the device value manager 514 to operate the production line using device values. For example, the controller 515 determines a device value indicating a control command to the semiconductor manufacturing apparatus 104 based on the device value indicating the input value of the switch 103. The controller 515 also monitors the device values X0 and X3. When receiving an input instruction for activating the general-purpose OS, the controller 515 activates the general-purpose OS using the power operation circuit 516. The controller 515 may further monitor the device values X1 and X2. When receiving an input instruction for deactivating the general-purpose OS, the controller 515 may provide, through the inter-OS communicator 53, the instruction for deactivating the general-purpose OS to a power manager 521 in the general-purpose OS implementer 52.

Figure 5:
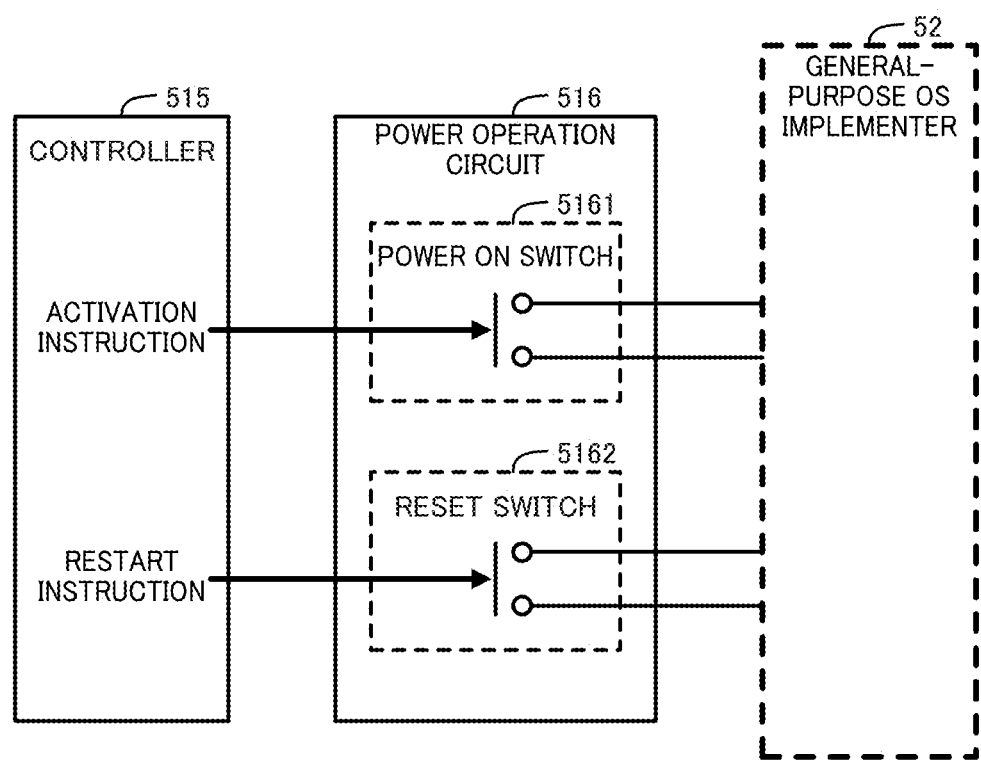
FIG. 5 is a block diagram of a power operation circuit in Embodiment 1.

As illustrated in FIG. 5, the power operation circuit 516 includes a power ON switch 5161 to input an instruction for activating the general-purpose OS into the general-purpose OS implementer 52, and a reset switch 5162 to input an instruction for restarting the general-purpose OS into the general-purpose OS implementer 52. Each of these switches is switched between ON and OFF in response to a signal output from the controller 515. To activate the general-purpose OS when the general-purpose OS is in the power-OFF state or in the standby state, the power operation circuit 516 turns on the power-ON switch 5161 to be conductive to supply power to the general-purpose OS implementer 52.

Referring back to FIG. 3, the general-purpose OS implementer 52 includes the power manager 521 to deactivate the general-purpose OS, a device value accessor 522 to access device values in the device value manager 514 through the inter-OS communicator 53, a network communication IF 523 to communicate through the network 300, and an information processing program 524 that operates with the general-purpose OS.

The power manager 521 is mainly implemented by the second processor 421. The power manager 521 may correspond to some of the functions of the general-purpose OS or application software with the general-purpose OS. When an instruction input for deactivating the general-purpose OS is provided from the real-time OS implementer 51 through the inter-OS communicator 53, the power manager 521 deactivates the general-purpose OS. More specifically, the power manager 521 executes a command for instructing the general-purpose OS to be shut down or enter the standby state. The power manager 521 may monitor the device values in the storage area 5141 through the device value accessor 522 to check for deactivating instructions.

The power manager 521 also periodically notifies the controller 515 of the power supply state of the general-purpose OS through the inter-OS communicator 53. The power manager 521 further updates the corresponding output device value in the storage area 5141 through the device value accessor 522 to a value indicating the current power supply state of the general-purpose OS. For example, upon startup of the general-purpose OS, the power manager 521 updates the above output device value to a value indicating power ON, and upon generation of a command to deactivate the general-purpose OS, the power manager 521 updates the above output device value to a value indicating power OFF before deactivating the general-purpose OS. The device value is updated in this manner to reflect the power supply state of the general-purpose OS in real time. The controller 515 may determine the power supply state of the general-purpose OS at least either by referring to the device value indicating the power supply state of the general-purpose OS, or based on direct notification from the power manager 521.

The device value accessor 522 is mainly implemented by the second processor 421. The device value accessor 522 may correspond to some of the functions of the general-purpose OS or application software with the general-purpose OS. The network communication IF 523 corresponds to the communicator 46. The information processing program 524 is application software that is generated based on a source code written by the user of the PLC 100 in, for example, a general-purpose programming language and operates with the general-purpose OS. The general-purpose OS implementer 52 executes the information processing program 524 to refer to the device values in the storage area 5141 through the device value accessor 522 and perform the information processing that is temporarily to be performed in the control system 10. The information processing includes, for example, collecting data and analyzing the collected data, and is performed to identify the cause of an abnormality or to analyze the state of the control system 10 upon occurrence of an abnormality.

Figure 6:
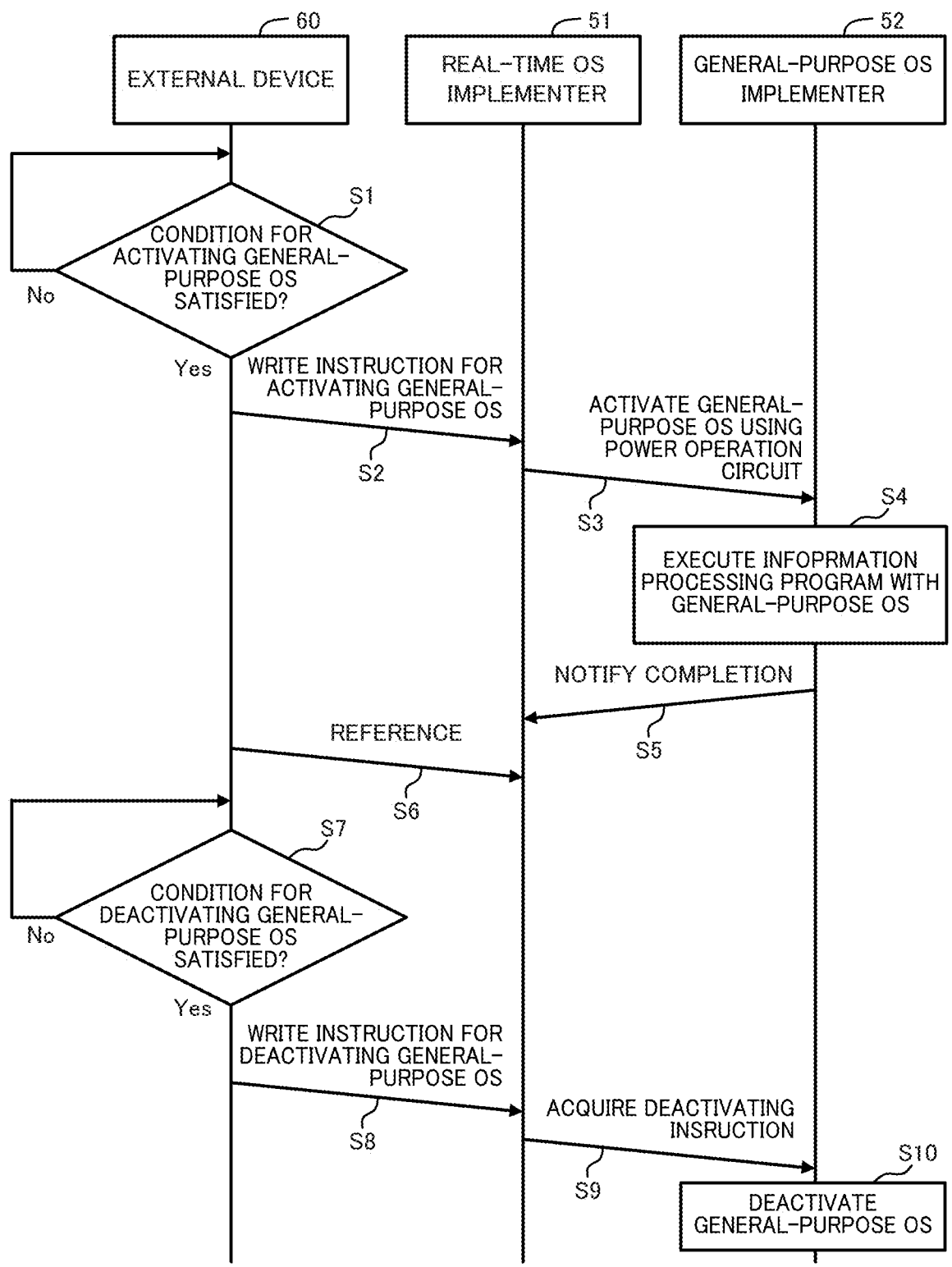
FIG. 6 is a flowchart of an operation of a power supply for a general-purpose OS in Embodiment 1.

The sequence of an operation of the power supply for the general-purpose OS in the control system 10 is described with reference to FIG. 6. An external device 60 illustrated in FIG. 6 corresponds to another module mounted on the base module 170 together with the controller unit 120, or to a device in the external system 20.

The external device 60 determines whether the condition for activating the general-purpose OS is satisfied (step S1). For example, the external device 60 determines whether an event including an abnormality predefined to receive analysis performed by the general-purpose OS is detected. When the condition for activating the general-purpose OS is not satisfied (No in step S1), the external device 60 repeats the determination in step S1.

When the condition for activating the general-purpose OS is satisfied (Yes in step S1), the external device 60 writes an instruction for activating the general-purpose OS into the storage area 5141 managed by the real-time OS implementer 51 (step S2). The external device 60 writes information about the activating condition together with an activating instruction. The information about the activating condition indicates, for example, the details of the abnormality.

The real-time OS implementer 51 then detects the activating instruction being written and activates the general-purpose OS using the power operation circuit 516 (step S3). This enables the general-purpose OS implementer 52 to perform the functions. Once the general-purpose OS is activated, the general-purpose OS implementer 52 executes the information processing program 524 with the general-purpose OS (step S4). More specifically, the general-purpose OS implementer 52 that executes the information processing program 524 collects the device values indicating information about the activating condition from the storage area 5141 through the device value accessor 522. The general-purpose OS implementer 52 analyzes the collected information and uploads the results of the analysis to the cloud server 30 through the network communication IF 523.

The general-purpose OS implementer 52 then notifies the real-time OS implementer 51 of the completion of the information processing (step S5). More specifically, the general-purpose OS implementer 52 writes a device value indicating the completion of the analysis of information into the storage area 5141. The external device 60 refers to the storage area 5141 (step S6) and determines whether the condition for deactivating the general-purpose OS is satisfied (step S7). The deactivating condition is satisfied when, for example, information sufficient for the external device 60 is analyzed. When the condition for deactivating the general-purpose OS is not satisfied (No in step S7), the external device 60 repeats the determination in step S7. The external device 60 may cause the information processing program 524 operating with the general-purpose OS to perform a second information analysis in cooperation with the general-purpose OS in operation.

When the condition for deactivating the general-purpose OS is satisfied (Yes in step S7), the external device 60 writes a device value indicating an instruction for deactivating the general-purpose OS into the storage area 5141 in the real-time OS implementer 51 (step S8). The general-purpose OS implementer 52 monitors the storage area 5141. When acquiring the deactivating instruction being written (step S9), the general-purpose OS implementer 52 executes a command to shut down the general-purpose OS and deactivates the general-purpose OS (step S10).

As described above, in the controller unit 120 according to the present embodiment, the real-time OS implementer 51 activates the general-purpose OS using the power operation circuit 516 when the PLC bus communication I/F 511 or the network communication IF 512 receives a device value as instruction data for activating the general-purpose OS, and the general-purpose OS implementer 52 deactivates the general-purpose OS when receiving instruction data for deactivating the general-purpose OS. Thus, the general-purpose OS is activated as appropriate. This reduces the power consumption of the PLC 100 with the general-purpose OS. The real-time OS implementer 51 corresponds to an example of activation means for activating a general-purpose OS.

A general-purpose OS has a more complex software configuration than a real-time OS. Thus, operating the general-purpose OS for a long time in the same manner as a real-time OS is likely to cause an unstable system operation and abnormal termination of the PLC 100. In contrast, the controller unit 120 according to the present embodiment reduces the operating time of the general-purpose OS to stabilize the operation of the PLC 100. Further, deactivating the general-purpose OS reduces the frequency of rewriting in the second main storage 422 and extends the product life of the controller unit 120.

The power supply state of the general-purpose OS is controlled using the device values managed by the real-time OS implementer 51. For example, the general-purpose OS implementer 52 monitors the storage area 5141 in the real-time OS implementer 51, and deactivates the general-purpose OS when a device value for deactivating the general-purpose OS is stored in the storage area 5141. The PLC 100 typically can synchronize or write and read device values. Thus, the PLC 100 can have an additional capability for information processing performed by the general-purpose OS without an additional circuit between the general-purpose OS and the external device for operating the power supply for the general-purpose OS. This reduces the development cost.

More specifically, a CPU module in a PLC 100 without a general-purpose OS can be replaced with the controller unit 120, and device values can be set to allow the other modules to use the functions of the general-purpose OS. For example, synchronizing the device values indicating the operation of the power supply for the general-purpose OS with data input into or output from other modules in the PLC 100 allows the general-purpose OS to be used easily in a manner interrelated with the inputs and outputs of other modules. In this case, the receiver circuit 5111 in the PLC bus communication IF 511 corresponds to an example of reception means for receiving reception data as data input into or output from another controller unit in the programmable controller. The first processor 411 updates the device values stored in the device value manager 514 to values equal to the reception data described above.

In the PLC 100, the data shared with the PLC 21 that is connected through the industrial network 200 may be set as the device values for operating the power supply for the general-purpose OS to allow the general-purpose OS to be used easily in a manner interrelated with the operation of the PLC 21. More specifically, the device values indicating the power supply state of the general-purpose OS may be stored into a storage area called a link device that is mutually accessible to PLC modules connected through the industrial network 200, and the device values are synchronized in real time using a refresh function. This allows the general-purpose OS to be used easily through the industrial network 200.

This also allows device values to be used to notify an external device of the power supply state of the general-purpose OS. These device values correspond to an example of power state data indicating the current power supply state of the general-purpose OS. The transmitter circuits 5112 and 5122 correspond to examples of transmission means for reading the power state data from storage means and transmitting the data to an external device.

Embodiment 2

Embodiment 2 is described focusing on the differences from Embodiment 1. Like reference signs denote the same or like components in Embodiment 1. In the examples of Embodiment 1 described above, the controller unit 120 with the general-purpose OS corresponds to the CPU module in the PLC 100. In some embodiments, the controller unit 120 may correspond to the network module 160.

Figure 7:
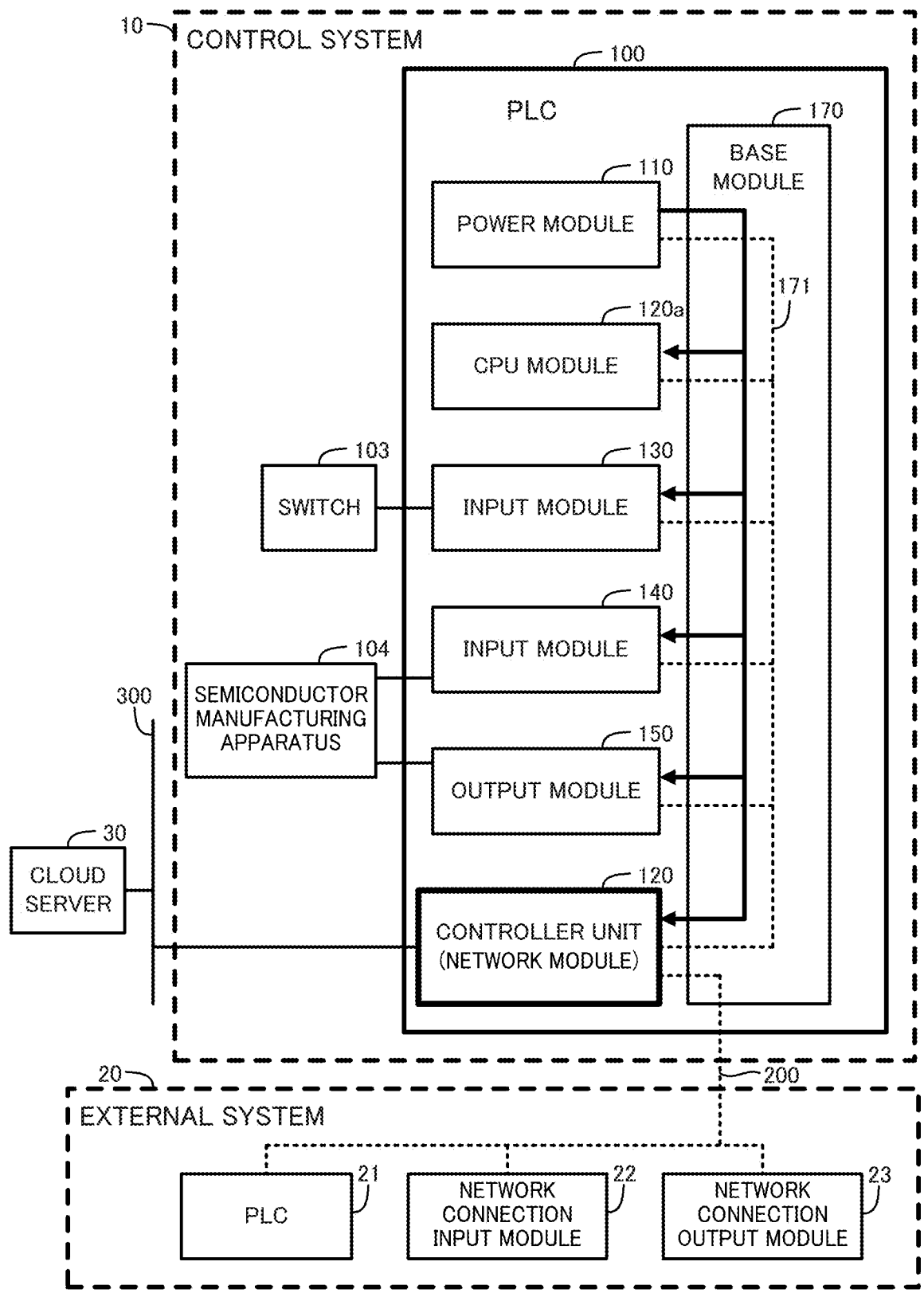
FIG. 7 is a block diagram of a PLC in Embodiment 2.

As illustrated in FIG. 7, the PLC 100 includes a CPU module 120a with no general-purpose OS, and a controller unit 120 functioning as a network module with a general-purpose OS. The controller unit 120 includes the components illustrated in FIGS. 2 and 3. However, the network communication IF 512 in the real-time OS implementer 51 communicates with devices in the external system 20 through the industrial network 200, and communicates with the cloud server 30 through the network 300.

As described above, when the controller unit 120 corresponds to a module performing the network function of the PLC 100, the power supply for the general-purpose OS can be operated from an external device.

Although one or more embodiments of the present disclosure have been described above, the present disclosure is not limited to the above embodiments.

In the examples described above, the general-purpose OS is with the CPU module or the network module, but may be with any other module. For example, the input module or the output module may be with a general-purpose OS. The controller unit 120 may also be an extension module intended primarily to add functionality of a general-purpose OS.

In the examples described above, the PLC 100 is a building-block controller. However, the PLC 100 is not limited to the above. The PLC 100 may be a controller containing multiple modules integrated in a single housing. The controller unit 120 may be a part of such an integrated controller.

The FA system is a semiconductor manufacturing system in the examples described above, but the FA system is not limited to the above. The FA system may be, for example, another manufacturing system, an inspection system, a machining system, or any other system.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is applicable to a controller with a general-purpose OS.

REFERENCE SIGNS LIST

10 Control system
100, 21 PLC
103 Switch
104 Semiconductor manufacturing apparatus
110 Power module
120 Controller unit
120a CPU module
130, 140 Input module
150 Output module
160 Network module
170 Base module
171 PLC bus
20 External system
22 Network connection input module
23 Network connection output module
200 Industrial network
30 Cloud server
300 Network
411 First processor
412 First main storage
421 Second processor
422 Second main storage
43 Auxiliary storage
431,432 Program
44 Input device
45 Output device
46 Communicator
47 Internal bus
51 Real-time OS implementer
511 PLC bus communication/F
5111, 5121 Receiver circuit
5112, 5122 Transmitter circuit
512 Network communication I/F
513 Dedicated protocol communicator
514 Device value manager
5141 Storage area
515 Controller
516 Power operation circuit
5161 Power ON switch
5162 Reset switch
52 General-purpose OS implementer
521 Power manager
522 Device value accessor
523 Network communication I/F
524 Information processing program
53 Inter-OS communicator
60 External device

The invention claimed is:
1. A controller unit in a programmable controller, the controller unit comprising:

a real-time operating system implementer including first processing circuitry to implement a real-time operating system; and a general-purpose operating system implementer including second processing circuitry to implement a general-purpose operating system, wherein the real-time operating system implementer further includes a receiver to receive instruction data indicating an instruction for changing a power supply state of the general-purpose operating system including activation and deactivation of the general-purpose operating system, and a power operation circuit to activate the general-purpose operating system, the real-time operating system implementer activates the general-purpose operating system using the power operation circuit when the receiver receives the instruction data for activating the general-purpose operating system, and the general-purpose operating system implementer deactivates the general-purpose operating system when the receiver receives the instruction data for deactivating the general-purpose operating system.

2. The controller unit according to claim 1, wherein the real-time operating system implementer further includes a storage to store the instruction data received by the receiver, and the general-purpose operating system implementer monitors the storage and deactivates the general-purpose operating system when the storage stores the instruction data for deactivating the general-purpose operating system.

3. The controller unit according to claim 2, wherein the receiver receives reception data being data input into another controller unit in the programmable controller or being data output from the another controller unit in the programmable controller, and the first processing circuitry updates the instruction data stored in the storage to data equal to the reception data.

4. The controller unit according to claim 3, wherein the general-purpose operating system implementer stores, into the storage, power state data indicating a current power supply state of the general-purpose operating system, and the real-time operating system implementer further includes a transmitter to read the power state data from the storage and transmit the read power state data to an external device.

5. The controller unit according to claim 2, wherein the instruction data stored in the storage is shared by the programmable controller with another programmable controller connected through a network.

6. The controller unit according to claim 5, wherein the receiver receives the instruction data through the network using a predetermined protocol.

7. The controller unit according to claim 6, wherein the general-purpose operating system implementer stores, into the storage, power state data indicating a current power supply state of the general-purpose operating system, and the real-time operating system implementer further includes a transmitter to read the power state data from the storage and transmit the read power state data to an external device.

8. The controller unit according to claim 2, wherein the general-purpose operating system implementer stores, into the storage, power state data indicating a current power supply state of the general-purpose operating system, and the real-time operating system implementer further includes a transmitter to read the power state data from the storage and transmit the read power state data to an external device.

9. The controller unit according to claim 5, wherein the general-purpose operating system implementer stores, into the storage, power state data indicating a current power supply state of the general-purpose operating system, and the real-time operating system implementer further includes a transmitter to read the power state data from the storage and transmit the read power state data to an external device.

10. A power supply operation method for operating a power supply for a general-purpose operating system in a controller unit in a programmable controller, the method comprising:

receiving, by a receiver included in a real-time operating system implementer, instruction data indicating an instruction for changing a power supply state of the general-purpose operating system including activation and deactivation of the general-purpose operating system, the real-time operating system implementer including first processing circuitry to implement a real-time operating system;

activating, by the real-time operating system implementer, the general-purpose operating system using a power operation circuit when the receiver receives the instruction data for activating the general-purpose operating system; and deactivating the general-purpose operating system by a general-purpose operating system implementer when the receiver receives the instruction data for deactivating the general-purpose operating system, the general-purpose operating system implementer including second processing circuitry to implement the general-purpose operating system.

* * * * *